(No Model.)
M. W. MARSDEN.
CORN PRODUCT AND PROCESS OF MAKING SAME.
No. 572,019. Patented Nov. 24, 1896.
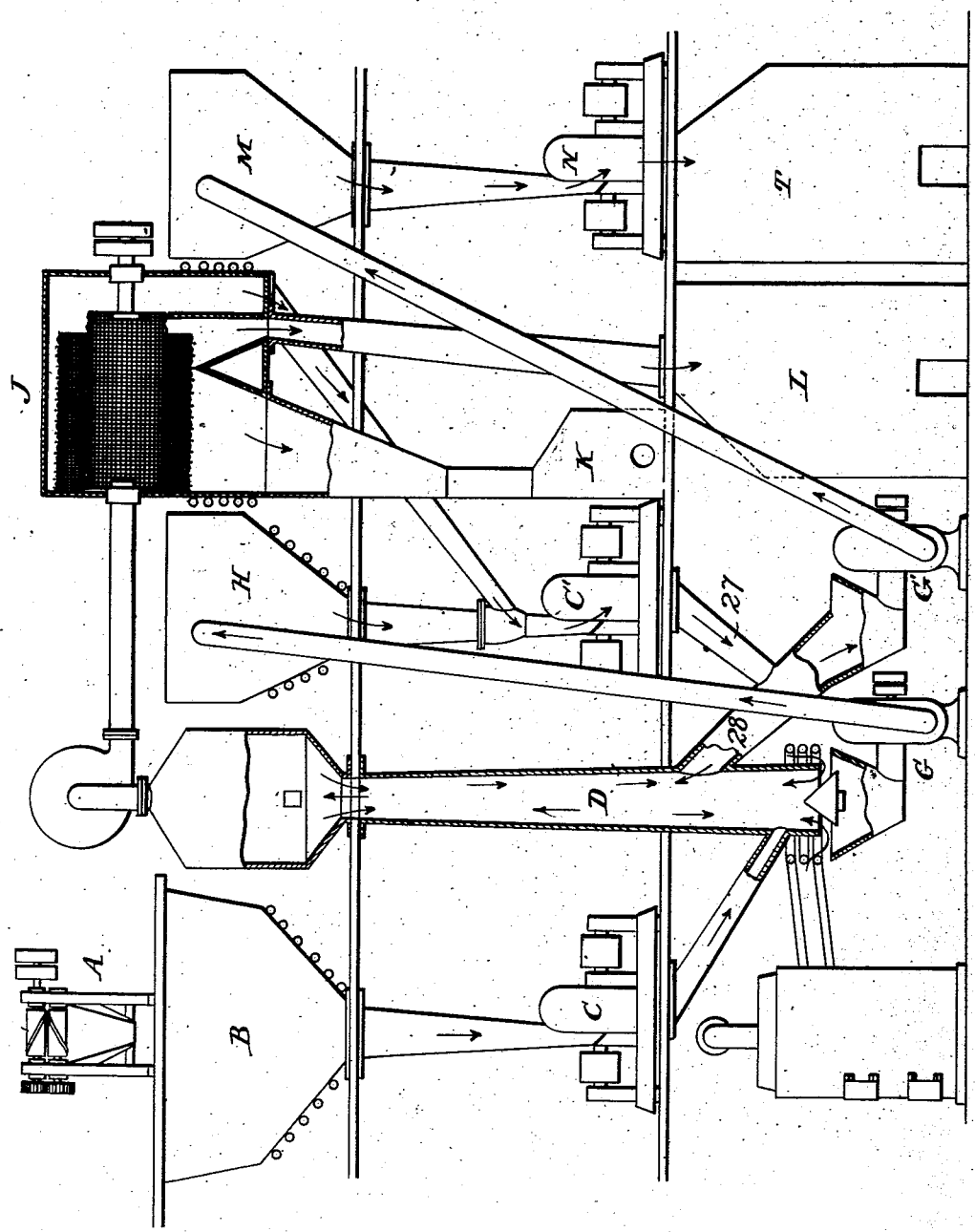

UNITED STATES PATENT OFFICE.

MARK WORSNOSS MARSDEN, OF PHILADELPHIA, PENNSYLVANIA.

CORN PRODUCT AND PROCESS OF MAKING SAME

SPECIFICATION forming part of Letters Patent No. 572,019, dated November 24, 1896.

Application filed March 6, 1896. Serial No. 582,126. (No specimens.)

*To all whom it may concern:*

Be it known that I, MARK WORSNOSS MARSDEN, a citizen of the United States, residing at Philadelphia, in the county of Philadelphia and State of Pennsylvania, have invented certain new and useful Improvements in Corn Products and Processes of Making the Same, of which the following is a specification.

Numerous efforts have been made from time to time to utilize cornstalks as a prepared and merchantable corn food for stock, but heretofore without success, and the stalks after the ears have been separated have not only proved to be a waste material to a great extent, but in many instances have been an expense, resulting from the necessity of removing and destroying or otherwise disposing of the same. In previous efforts in this direction one of the most promising for a long time consisted in growing the stalks solely for food purposes, cutting them, and preserving them in silos. This has proved to be available only to a very limited extent because it is adapted only for local use with green fodder, not capable of transportation, and the land cultivated is available only for feed purposes. Often the crops must be cut at the time when the services of laborers are most needed for other farming operations, an expensive pit is required, the material stored is often spoiled by decomposition, and the food preserved is not capable of transportation to any extent.

Where it has been sought to utilize the stalks after the ears have been removed, it has not been uncommon for the farmer to chop them up and feed them to his stock. This can only utilize the stalks to a very limited extent, as few farmers can thus make use of their entire stalk product, and even when thus utilized it is only a portion of the food constituents of the stalk that are fully available. This results from the fact that the animals refuse to eat a large proportion of the stalks. When the stalks have been dried before feeding, the presence of the pith is extremely detrimental. So far as I am aware I was the first to discover that the pith of Indian corn in a dried state has a capacity to rapidly absorb water and will thus take up many times its own weight, so that the presence of such an absorbent material in the mouth, when the material is fed dry, rapidly absorbs the saliva, preventing proper or comfortable mastication, and any partially-masticated pith entering the stomach will absorb the juices which otherwise would aid in digesting available portions of the stalk. In the practice of feeding chopped stalks it is generally sought to render them more palatable by sifting ground corn over the same, but even in such case there are portions which the animals will not eat, which accumulate in the troughs or mangers and become sour and decomposed, rendering an extraordinary amount of cleansing and attention necessary to preserve the stables in proper condition. Efforts have been made to preserve the cut stalks for future use, but this has been attended with danger and damage incident to the fact that when collected such stalks will contain as much as forty per cent. of water, and when stored for preservation after cutting the mass becomes heated and molds, and in some cases spontaneous combustion has resulted, destroying the buildings and their contents.

I have succeeded in converting this heretofore practically waste material into a highly valuable product by separating the main portions of the pith and shell, breaking up the particles, separating the impurities and finer particles of pith and then reducing the entire body of shell to a state and condition in which it is acceptable and palatable and nutritious to the animal, adapted to be acted upon to the best advantage by the saliva and juices of the stomach without detrimental results, and while containing a greater percentage of nutriment than when in its natural condition is much less in bulk and commercially in a state best fitted for preservation, transportation, and sale.

In operating upon the stalk to reduce the different parts of the same to the condition best adapted for use I have found it necessary to devise a novel series of operations in order to effectively reduce large masses of material. Without setting forth all the details of construction of the apparatus not here claimed I will illustrate in the accompanying drawing sufficient of the same to enable the series of steps constituting the process of reduction to be understood.

The cornstalks, as they are brought from the field with or without the leaves attached, are in the first instance cut into suitable lengths, from one to five inches, by a cutter A. If desired, the broken leaves may be separated from the stalks. The divided particles are collected in a hopper B and thence are passed to an attrition-mill C, which breaks up the outer fibrous portion or shell of the stalk, detaching and partially breaking up the pith. The broken material is then carried to a pneumatic separator D, wherein an air-current carries up the lighter particles, mainly pith, but with some portions of stalk, and conveys them to a screener J, while the heavier particles, mainly shell, pass downward to a blower G, the air-current of which carries them upward to a hopper H. From the hopper H the material passes to a second attrition-mill C', which also receives the larger and heavier particles passing from the screener J and breaks and separates the same. The heavier particles of shell from the mill C' pass through conduits 27 28 to a blower G'. The conduit 28, however, also communicates with the bottom of the separator D, and the upward air-current in the latter draws into the same the finer particles of pith from the conduit 27. The blower G' forces the heavy material which passes thereto into a hopper M, from which it passes through a grinding-mill N, wherein the shell is reduced to the form of meal and discharged into the bin T. In the screener J the dust and impurities are separated and discharged into the bin K, while the fine particles of pith are also separated from the remaining larger particles and any particles of shell and are discharged into the bin L.

It will be seen that the screener separates the dust and impurities, the sufficiently fine particles of pith, and the larger particles of pith, and any portions of shell, discharging such larger portions of pith and shell into the mill C', and that if any particles of pith pass from the mill C' in too large a state they will be carried to the separator and back to the screener and again pass through the mill, this circle of operations continuing until the pith is properly reduced.

The heat generated in grinding will generally dry the material, but where required the air as well as the material may be heated by the heater-coils F 39 39, any necessary preliminary drying being effected in the hopper B by the heater-coil 8.

The fibrous portion or shell of the stalk thus separated from the pith and other detrimental matters, subjected to the action of air and comminuted, constitutes a new food product, which is in a merchantable, transportable, and stable condition, more capable of being preserved and transported than ordinary cornmeal, and containing nearly ninety per cent. of nutritious matter as against only about thirty per cent. of nutritious matter found in the cornstalks in their natural condition before the pith and impurities were removed. As thus utilized the farmer can obtain from the heretofore practically waste and useless material, in addition to the value of the grain crop, a material which will afford him more profit than would a crop of timothy grown upon the same acreage.

By the process of comminuting the material and exposing it intimately to the drying action of the air, the saccharose present in the material is to a large extent converted into glucose, and the constitution of the material is thereby so altered that practically the first stages of digestion are effected before the material is fed to the animal, so that the action in the stomach is different from that which results when the material is fed in its natural condition.

While the new food product thus obtained is valuable for use alone, it has special advantages in combination with other materials and is better adapted to thus form a food ration than any other substance. In fact I know of no other substance which can be employed as a vehicle in combination with other materials to constitute a balanced ration for stock. The meal produced by grinding up the fibrous portion of the stalk contains about one part of nitrogenous food elements to fifteen parts of carbonaceous food elements, and therefore will effectively combine with cotton-seed meal or linseed-meal or other materials richer in other elements needed to make a balanced ration, and, being in the form of a meal or powder, such combination may be readily effected and permanently maintained.

One preparation of food ration consists of new corn product, two hundred and ten parts; hominy chop, thirty parts; wheat bran, thirty parts; linseed-meal, fifteen parts; cotton-seed meal, fifteen parts.

In some instances advantage results from condensing or consolidating the material under pressure in connection with a binding agent, so as to form it into lumps or particles which require a certain amount of chewing to disintegrate, which is advantageous, as the act of chewing causes a secretion of saliva, which aids digestion. For this purpose I combine with the meal any desired proportion of cotton-seed meal, linseed-meal, swill from the breweries, or other liquid food, which of itself is nutritious and digestible, forming a mass capable of consolidation under pressure in molds into cakes or blocks which may be broken up and fed to the animals in pieces of such size and solidity as to be readily chewed. Thus to the proportions of ingredients above specified I add five parts of glucose, which serves as a binding agent.

I do not here claim the apparatus described, this constituting the subject of a separate application for Letters Patent, Serial No. 582,127.

I claim as my invention—

1. The within-described corn product consisting of the dried and comminuted fibrous portions of cornstalk, separated from the pith and other detrimental matters, substantially as set forth.

2. A new manufacture consisting of the outer fibrous portion of dried cornstalks, ground and mixed with cotton-seed or other food material containing different food elements, substantially as described.

3. A new manufacture consisting of the fibrous portion of cornstalk ground or comminuted, and combined with a binding agent and pressed in cakes, substantially as described.

4. The process hereinbefore described of preparing a product from cornstalks, consisting in separating the fibrous portions of the stalk from the pith and impurities, the said fibrous portions being comminuted and subjected to the action of air, substantially as described.

5. The hereinbefore-described method of preparing food product from plants having piths and shells consisting in separating the pith and shell portions and in reducing the latter to a comminuted condition and subjecting it to the action of air, substantially as described.

In testimony whereof I have signed my name to this specification in the presence of two subscribing witnesses.

MARK WORSNOSS MARSDEN.

Witnesses:
 REUBEN A. MILLER,
 GUS T. BRANNON.